United States Patent
Nylander et al.

(10) Patent No.: US 8,588,734 B2
(45) Date of Patent: Nov. 19, 2013

(54) METHOD AND APPARATUS FOR PROVIDING DIFFERENTIATED SERVICES IN COMMUNICATIONS NETWORK

(75) Inventors: Tomas Nylander, Värmdö (SE); Jari Vikberg, Järna (SE); Magnus Hallenstål, Täby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 734 days.

(21) Appl. No.: 12/339,523

(22) Filed: Dec. 19, 2008

(65) Prior Publication Data
US 2009/0181652 A1  Jul. 16, 2009

(30) Foreign Application Priority Data
Dec. 21, 2007 (EP) .................................. 07150392

(51) Int. Cl.
*H04M 11/00* (2006.01)
(52) U.S. Cl.
USPC ............. 455/406; 455/414.1; 455/456.1; 455/456.3; 379/114.01; 379/114.05; 379/121.01
(58) Field of Classification Search
USPC ............. 455/406, 407, 408, 414.1–417, 455/456.1–457; 379/13, 1.4, 111–141
See application file for complete search history.

(56) References Cited

U.S. PATENT DOCUMENTS

| | | | |
|---|---|---|---|
| 5,712,908 A * | 1/1998 | Brinkman et al. | 379/114.28 |
| 5,901,207 A * | 5/1999 | Pickeral | 379/127.01 |
| 6,366,560 B1 | 4/2002 | Ohiwane et al. | |
| 2004/0132427 A1* | 7/2004 | Lee et al. | 455/406 |
| 2005/0213721 A1* | 9/2005 | Hakala et al. | 379/114.01 |
| 2006/0168303 A1* | 7/2006 | Oyama et al. | 709/231 |
| 2007/0004429 A1* | 1/2007 | Edge et al. | 455/456.1 |
| 2007/0177548 A1* | 8/2007 | Oyama et al. | 370/331 |
| 2008/0045239 A1* | 2/2008 | Sun | 455/456.1 |
| 2008/0076421 A1* | 3/2008 | Schwarz | 455/435.3 |
| 2009/0117874 A1* | 5/2009 | Ye et al. | 455/406 |
| 2009/0176479 A1* | 7/2009 | Vikberg et al. | 455/406 |

OTHER PUBLICATIONS

"Digital cellular telecommunications system (Phase 2+); Generic access to the A/Gb interface; Stage 2 (3GPP TS 43.318 version 7.3.0 Release 7); ETSI TS 143 318" ETSI Standards, LIS, vol. 3-G1, No. V7.3.0, Oct. 1, 2007.

* cited by examiner

Primary Examiner — Allahyar Kasraian

(57) ABSTRACT

A method and a mobile services switching center of providing differentiated services in a communications network. The method comprises receiving in a mobile services switching center an indication message from a first radio access network, said message indicating a radio access network type to which a called communication apparatus of a terminating communication session is connected, in response to the indication message: accessing differentiated service information associated with the radio access network type of the terminating communication session, and sending the differentiated service information to be applied for service differentiation by a second access network of calling communication apparatus.

16 Claims, 3 Drawing Sheets

METHOD AND APPARATUS FOR PROVIDING DIFFERENTIATED SERVICES IN COMMUNICATIONS NETWORK

TECHNICAL FIELD

The present invention relates generally to a method and apparatus for providing differentiated services in a communications network, and more particularly to a method and apparatus for providing differentiated services in a communications network having different access network types.

BACKGROUND

Different new access technologies and networks are being introduced towards mobile core networks and mobile services. Two examples of these are Generic Access Network (GAN), also known as Unlicensed Mobile Access (UMA), and Femto GSM and WCDMA solutions. The GAN solutions were initially defined in the $3^{rd}$ generation partnership project (3GPP) TS 43.318 and 44.318 for 3GPP Releases 6 and 7. In these specifications, the GAN can be used to provide access to second generation public land mobile networks (PLMN) and the services available in these networks including GSM (Global System for Mobile Communication), EDGE (Enhanced Data rates for GSM Evolution) and GPRS (General Packet Radio Service networks). The interfaces used between GAN and the CN in these GAN solutions are the typical GSM RAN-CN interfaces, i.e. A and Gb interfaces for voice and data traffic, respectively, as defined in 3GPP TS 48.008 and 3GPP TS 48.018. In addition, work is now ongoing in 3GPP for Release 8 to specify generic access networks for third generation services, i.e. for UMTS (Universal Mobile Telecommunications System) or WCDMA (Wideband Code Division Multiple Access). The corresponding technical specifications will be called 3GPP TS 43.319 and 44.319 and will also include the previous content from specifications 43.318 and 44.318 in 3GPP Releases 6 and 7. This addition will provide the possibility to use the existing UMTS/WCDMA RAN-CN interfaces between the GAN and the CN, i.e. Iu-cs and Iu-ps interfaces, for voice and data traffic, respectively as defined in 3GPP TS 25.410. All these GAN solutions are based on usage of unlicensed radio technology and need new mobile terminals. Generic Access Network (GAN) is a technology that enables GSM and WCDMA services to be delivered over broadband access network and WLAN, at homes or in offices. End users will enjoy the same service as in the wide area network.

The Femto GSM and Femto WCDMA solutions use also, in a similar way as the GAN solutions, the existing RAN-CN interfaces, i.e. the A and Gb interfaces in the Femto GSM and the Iu interfaces in the Femto WCDMA solution.

The GAN technology defines an access network to the mobile core network that can be used to access the existing circuit-switched and packet-switched services. The access network is based on use of unlicensed spectrum and IP-based broadband access networks that may include both wireless and wired portions. GAN can be seen as complementary to GSM and WCDMA radio networks providing local area coverage. The GAN infrastructure should preferably be integrated in to the existing radio network infrastructure to optimize network performance. With GAN the end user experience remains the same in the WLAN radio network as in GSM and WCDMA radio networks, including seamless handover and roaming between these radio networks. GSM and WCDMA services are available when the end user is connected via the WLAN.

The Femto GSM and WCDMA solutions are based on using existing mobile terminals and the existing licensed radio technologies.

The GAN solutions can be used in combination with an existing Access Point (AP), e.g. a WiFi or WLAN AP. The Femto GSM and Femto WCDMA solutions need a new Home Access Point (AP) to provide the local coverage at e.g. homes. Other call rates and other or additional services may be provided while the Home AP is used to access the mobile services. This means also that the operator macro GSM or WCDMA network is offloaded with the traffic created over the GAN or Femto solutions. The cheaper call rates are also needed as the end users pay and provide part of the communication needed (e.g. the Home AP and/or the broadband access connection).

The cheaper call rates for mobile originating calls and transactions are known and there exist different solutions for this need. Different charging for mobile terminated calls and other service differentiations when the new access technologies are used is also desired. A problem with service differentiation comes from the main advantage of the new access technologies, i.e. that the terminal has one single telephone number that is used when the terminal is connected via the existing macro networks and the new access networks. This means that the tariff or call rate can not be selected in the originating network only based on the called number of the B-party as the same number is used independently of the access network being used by the called party in the terminating network. In the same way, the transparency of the GAN and the Femto solutions to the CN (as existing RAN-CN interfaces are used) means that the CN in the terminating side is not necessarily aware of when GAN or the Femto solutions are being used by the called user.

There exists some IN (Intelligent Network) based solutions that can be used to have different charging based on "A" and "B" side locations, e.g. one tariff if both subscribers are in the same town. These methods are using information from the HLR, e.g. Location Number or VLR number. The main problem with such a solution is that one (MSC/)VLR cannot be used to serve different types of accesses (e.g. GAN, GSM, Femto GSM, Femto WCDMA) with different types of charging for mobile terminated calls. This problem comes from the fact that the HLR is for example not updated with a new VLR number when the end user moves between GAN and GSM accesses connected to the same MSC/VLR. In the same way, if "A" and "B" sides are connected to different networks, then the existing logic based on finding out that the users are in the same town using the same network can not be applied i.e. there is no known way to communicate the needed information between different networks and apply it for charging. One of the main goals with adding the new GAN and Femto solutions is to keep the added signaling load in the CN to a minimum possible. This means that it is desired that an end user moving between for example the GSM and GAN accesses doesn't need to change the current MSC/VLR. This means for example that Inter-MSC handovers and location updates are avoided to minimize the Inter-MSC and HLR signaling.

SUMMARY

It is an object of the present invention to provide a method and apparatus for providing differentiated services in a communications network having different access network types.

One aspect of the present invention is a method of providing differentiated services in a communications network. The method comprises:

receiving in a mobile services switching centre an indication message from a first radio access network, said message indicating a radio access network type to which a called communication apparatus of a terminating communication session is connected, in response to the indication message:

accessing differentiated service information associated with the radio access network type of the terminating communication session, and sending the differentiated service information to be applied for service differentiation by a second access network of calling communication apparatus.

Thanks to this method, service differentiation in a communications network having different access network types can be provided by means of existing signaling protocols.

In one or more embodiments, the step of sending differentiated service information comprises sending a Charge Information ISUP message with the differentiated service information indicated in a Tariff Indicator field.

In one or more embodiments the step of sending differentiated service information comprises sending an Answer ISUP message with the differentiated service information indicated in a Generic or Connected Number field.

In one or more embodiments the step of sending differentiated service information comprises sending a Connect ISUP message with the differentiated service information indicated in a Generic or Connected Number field.

In one or more embodiments the step of sending differentiated service information comprises sending one or more of said Charge Information ISUP message and said Answer ISUP message or a Connect ISUP message with the tariff information indicated in a Generic or Connected Number field.

In one or more embodiments the step of accessing the differentiated service information comprises accessing an internal service information of the mobile services switching centre (108,109) and amending the differentiated service information based on the first radio access network type.

The radio access network to which the called mobile communication apparatus is connected and the radio access network to which the calling mobile communication apparatus is connected may be different radio access networks.

The location information can be Location Area Identities, LAI, or Cell Global Identifiers, CGI, for GSM networks or Location Area Identities, LAI, or Service Area Identities, SAI, for UMTS networks, or Charging Type.

The radio access network to which the called mobile communication apparatus is connected can be any of a GSM, Generic Access Network, Femto GSM, or WCDMA network.

The radio access network to which the calling mobile communication apparatus is connected can be any of a public switched telephone network, GSM, Generic Access Network, Femto GSM, or WCDMA network.

The differentiated service information may advantageously, but is not limited to, charging information for differentiated charging of terminating communication sessions.

A second aspect of the invention is a mobile services switching centre for differentiated charging of terminating communication sessions with computer capabilities. The mobile services switching centre may comprise: a computer processor for executing computer programs and processing data, and storage means connected to the computer processor for storing data and computer program. The mobile services switching centre may be configured to:

store differentiated service information associated with different radio access types, receive an indication message from a first radio access network, said message indicating the radio access network type to which a called communication apparatus of a terminating communication session is connected, in response to the indication message:

access differentiated service information associated with the radio access network type of the terminating communication session, and send the differentiated service information to be applied by a second access network of calling communication apparatus.

In one or more embodiments the computer processor of the mobile services switching centre may be configured to access the differentiated service information in a table to decide if a differentiated service should be indicated with respect to the current network of the called terminal towards the network from where the call was initiated.

The differentiated service information may advantageously be, but is not limited to, charging information.

Moreover, the charging information may be a numeric value indicating a specific tariff, or a prefix, or whole telephone number that is to be used to create a generic or connected number.

In one or more embodiments, the location information is Location Area Identities, LAI, or Cell Global Identifiers, CGI, for GSM networks or Location Area Identities, LAI, or Service Area Identities, SAI, for UMTS networks, or Charging Type. It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

In order to explain the invention in more detail and the advantages and features of the invention, a preferred embodiment will be described in detail below, reference being made to the accompanying drawings, in which.

DETAILED DESCRIPTION

Figure 1:
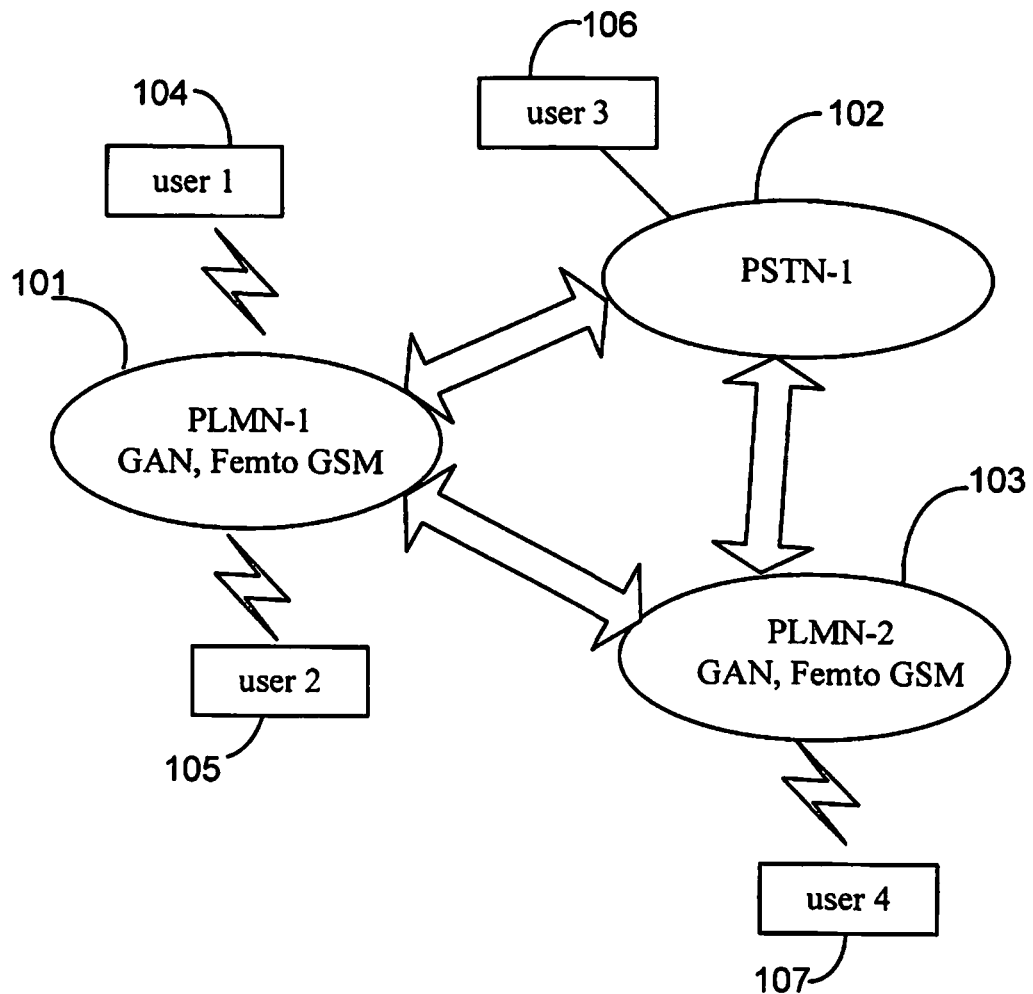
FIG. 1 illustrates an example of three different communications networks within which embodiments of present invention may be practiced.

FIG. 1 illustrates an example of three different communications networks within which embodiments of present invention, i.e. a method and apparatus for providing differentiated services depending on the access network type of a called communication apparatus, may be practiced.

According to some embodiments, tariffs and/or charging may depend on the access network used on the "B-subscriber side" i.e. in the network terminating the call. A public land mobile network (PLMN) handling or terminating a mobile terminated call, returns an indication about the access network, being used, to terminate the call to the network from where the call is originated. The Core Network (CN) receives an indication of the current location from the Radio Access Network (RAN) and uses this indication to check whether a specific tariff should be indicated towards the originating network. In another embodiment, the CN receives a charging indication from the RAN and uses this indication to check whether a specific tariff should be indicated towards the originating network. In this case, the RAN contains the logic needed to select the appropriate tariff or charging class for an end user and indicates this to the CN. The selection of the appropriate tariff or charging class for an end user could be based for example on knowledge of the current AP being used in the GAN or Femto solutions.

A first network may be PLMN-1 101, which is a mobile network that provides macro network services (e.g. GSM) and in addition also Generic Access Network (GAN) and Femto GSM based services. A second network may be PSTN-1 102, which is a fixed network and a third network, may be PLMN-2 103, which is a conventional mobile network that only provides macro network services (e.g. GSM or WCDMA). In one or more embodiments two different end users may operate in PLMN-1, wherein a user-1 may be connected to the macro GSM network by means of a first terminal 104, and a user-2 may be connected via either GAN or the Femto GSM by means of a second terminal 105. Also, even not depicted, all or part of the end users in the PLMN-1 may dynamically move between e.g. the GAN and Femto GSM accesses. Moreover, a user-3 may be connected to the PSTN-1 102 by means of a third terminal 106, and a user-4 may be connected to PLMN-2 103 by means of a fourth terminal 107.

The term terminal or communication apparatus includes portable radio communication equipment. The term portable radio communication equipment includes all equipment such as mobile telephones, pagers, communicators, i.e. electronic organizers, smartphones or the like.

Embodiments of the method and apparatus for providing differentiated tariffs or charging depending on the access network of a called mobile communication apparatus are described with reference to FIG. 2. A mobile terminated call is triggered towards user-2 of terminal 105 in PLMN-1 101 from user-3 of terminal 106 in PSTN-1 102. The messaging between the network PLMN-1 101 and the network PSTN-1 102 as well as the messaging between components within the PLMN-1 101 is described. The embodiment of the method is described with reference to the called user-2 of terminal 105 in PLMN-1 101 and consequently the messaging within the PSTN-1 102 is only described in general.

The network PLMN 1 101 is configured with, but is not limited to included, a mobile services switching centre (MSC) 108 with a visitors location register (VLR) 109; a home location register (HLR) 110; a gateway mobile services switching centre (GMSC) 111, and a generic access network (GAN) 112 to which the user-2 of terminal 105 is currently associated.

The (G)MSC provides the network with specific data about individual mobile phones and operates as an interface towards other networks such as other PLMNs, or the public switched network (PSTN). The MSC/VLR 108,109 may be embodied as a programmable apparatus or a data processing system, including a computer processor for executing computer programs and processing data, and storage means connected to the computer processor for storing data and computer program.

The VLR 109 contains relevant data of all mobiles currently located or roaming within the serving (G)MSC 108, 111. The VLR 109 has to support the (G)MSC 108,111 during call establishment when a call is coming from for example a mobile telephone.

The HLR 102 stores the identity and user data of all the subscribers belonging to the area of the related (G)MSC 108,111. Moreover, the HLR 102 provides the (G)MSC 108, 111 with the necessary subscriber data when a call is coming from a public switched network (PSTN), the Internet etc.

According to one or more advantage embodiments, the MSC/VLR 108,109 is configured with location and charging information. The location information depends on type of the mobile network, e.g. Location Area Identities (LAI) or Cell Global Identifiers (CGI) for GSM networks or Location Area Identities (LAI) or Service Area Identities (SAI) for UMTS networks. The location information may also include some additional identifier that is indicated from the RAN towards the CN (e.g. MSC/VLR).

The location information may be stored in a table 1 associated with the MSC/VLR 108,109. The first column contains the location or charging indicated from the called RAN and the second column shows the charging tariff to be used for the location in the first column.

TABLE 1

| Location/Charging | Charging tariff |
|---|---|
| LAI-1 | Tariff 1 |
| LAI-2 | Tariff 2 |
| SAI-1 | Tariff 3 |
| CT-x | Tariff 4 |
| CGI-1 | Tariff 5 |

The different possible entries are Service Area Identity (SAI), Location Area Identity (LAI), Cell Global Identity (CGI) or any parts of these and Charging Type (CT). The CT indication means that current RAN (e.g. GAN, Femto) contains the logic needed to select a charging tariff for the end user and this selection is transferred from the RAN to the CN as a CT information. The CT indication could in the simplest form be of the type defining the current access being used, e.g. GAN, Femto GSM, Femto WCDMA. In addition, the CT indication could contain information on more detailed level also based on the current AP being used in the GAN or Femto solutions. In this case, the indication could for example be that a "Home AP" is being used or that an "Office AP" is being used. Other possibilities are obvious and depend on the information configured in the RAN. Some further examples are e.g. "Visitor on an AP" and "Hotspot AP" being used. The CT solution means that the relevant signaling needs to be enhanced for example in the A interface for the BSSMAP protocol as defined in 3GPP TS 48.008. The relevant messages where the CT indication could be added are in the exemplary A interface case are the COMPLETE LAYER 3 INFORMATION, HANDOVER REQUEST ACK and HANDOVER PERFORMED. The other interfaces like Iu and Gb can be extended with similar mechanisms. The MSC/VLR 108,109 is configured to check the location and charging information in the table 1 to decide if a specific tariff should be indicated with respect to the current network of the called terminal towards the network from where the call was initiated.

The tariff, i.e. Tariff 1-5 in this embodiment, may be a numeric value indicating a specific tariff or e.g. a prefix or whole telephone number that is to be used to create a generic or connected number. Although the table has 5 locations/charging types and 5 tariffs, the table may include fewer or more locations/chargings and tariffs in one or more embodiments. The tariffs do not necessary have to be different for different locations/chargings, but may of course be the same for one or more locations/chargings.

User-2 of terminal 105 is connected via GAN 112 access in PLMN-1 101 in step 1. User-3 of terminal 106 in PSTN-1 102 initiates a call towards user-2 of terminal 105 in step 2 and the call is forwarded through PLMN-1 101 according to known principles. Hence, an IAM message with the called party=user-2 MSISDN is sent from the PSTN-1 102 to the GMSC 111 in PLMN-1 101 in step 3. In step 4, the MSISDN of user-2 of terminal 105 is forwarded in an Send Routing Information (SRI) message to the HLR 110, which sends an Provide Routing Number (PRN) message with the IMSI of the user-2 of terminal 105 to the MSC/VLR 108,109 in step 5. The MSC/VLR 108,109 acknowledges with a PRN ACK (MSRN) message to the HLR 110 in step 6, the content of which is forwarded in an SRI ACK(MSRN) message to the GMSC 111 in step 7. The GMSC 111 then sends an IAM (MSRN) message to the MSC/VLR 108 in step 8 as it has received the needed information from the HLR in the SRI ACK(MSRN) message.

In response to the received IAM(MSRN) message, the MSC/VLR 108,109 pages the terminal of user-2 of terminal 105 via GAN 112 access in step 9 using existing principles and methods. The terminal of user-2 of terminal 105 replies with a paging response to the GAN 112 which forwards complete layer 3 information with cell global identity (CGI) and paging response to the MSC/VLR 108,109 in step 11.

The MSC/VLR 108,109 checks the location and charging information in the table 1 in step 12 to decide if a specific tariff should be indicated towards the network PLMN-1 101 where the call was initiated from. As the MSC/VLR 108,109 may be configured with specific tariff information in the table 1 for the current cell of the user-2 of terminal 105, the MSC/VLR 108,109 informs the PSTN-1 about the specific charging in step 13.

Figure 3:
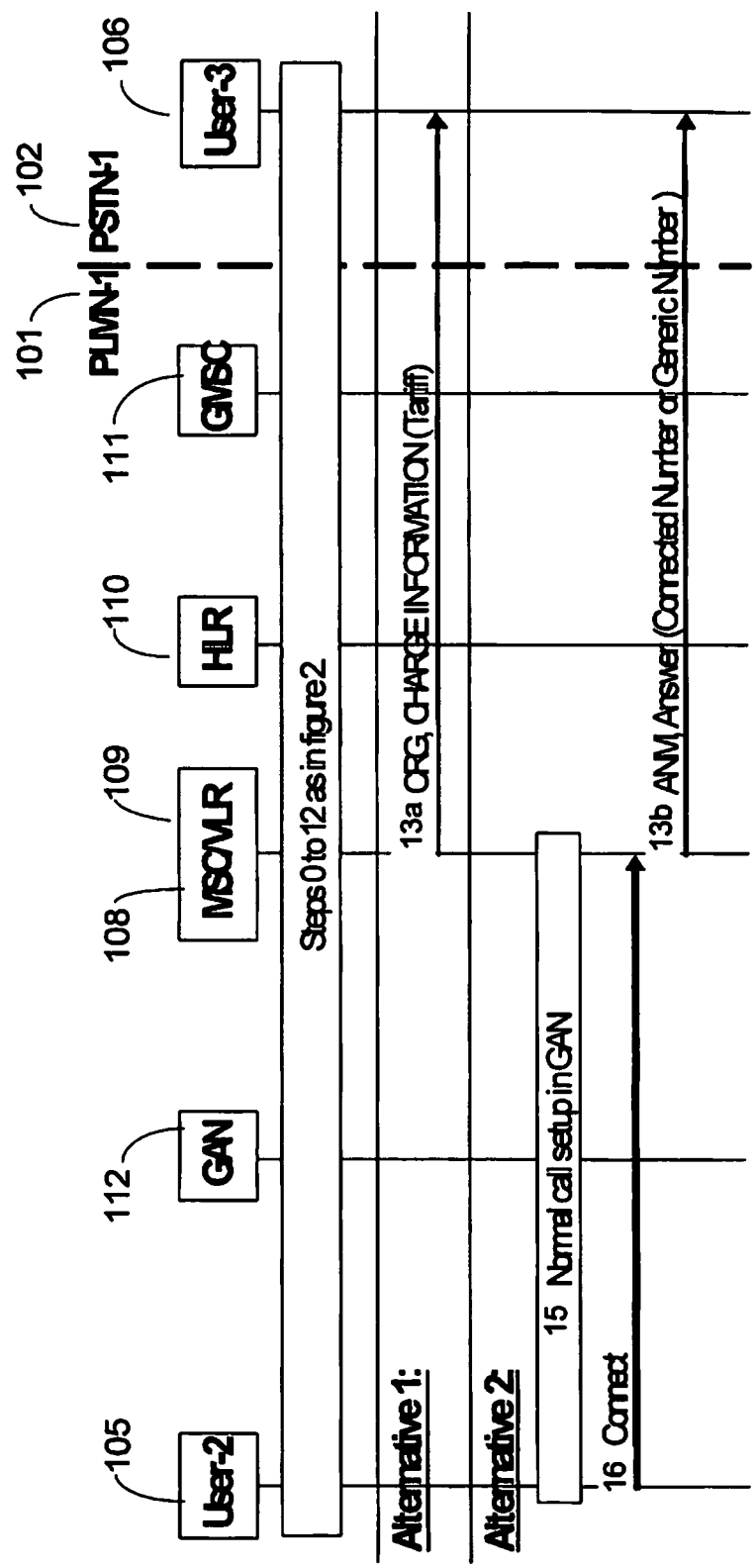
FIG. 3 shows further alternative embodiments of the method and apparatus of FIG. 2.

Once the MSC/VLR has found out the charging tariff by accessing the table 1 to be indicated towards the originating network, there may be at least two ways to send the indication, which is illustrated in FIG. 3.

According to a first alternative 1, the MSC/VLR 108,109 sends a Charge Information (CRG) ISUP message (CRG has so far been defined for national use but could in this case be used between any types of networks) to the originating network in step 13a as soon as it has found out that a specific tariff needs to be applied and is allowed according to the call states (e.g. after ACM, Address Complete). The new tariff is indicated e.g. in the Tariff Indicator field in the message.

According to a second alternative 2, the terminating call is established between the user-2 of terminal 105 and the MSC/VLR 108,109 in step 159 using existing principles and methods. Once this is done, i.e. the MSC/VLR receives a Connect message from the terminal 105 in step 15, the MSC/VLR 108,109 sends an Answer (ANM) ISUP message (e.g. after ACM, Address Complete) or the Connect (CON) ISUP message to the originating network PSTN-1 102 in step 13b. This message contains the Generic or Connected Number that indicates e.g. a fixed terminating domain.

Figure 2:
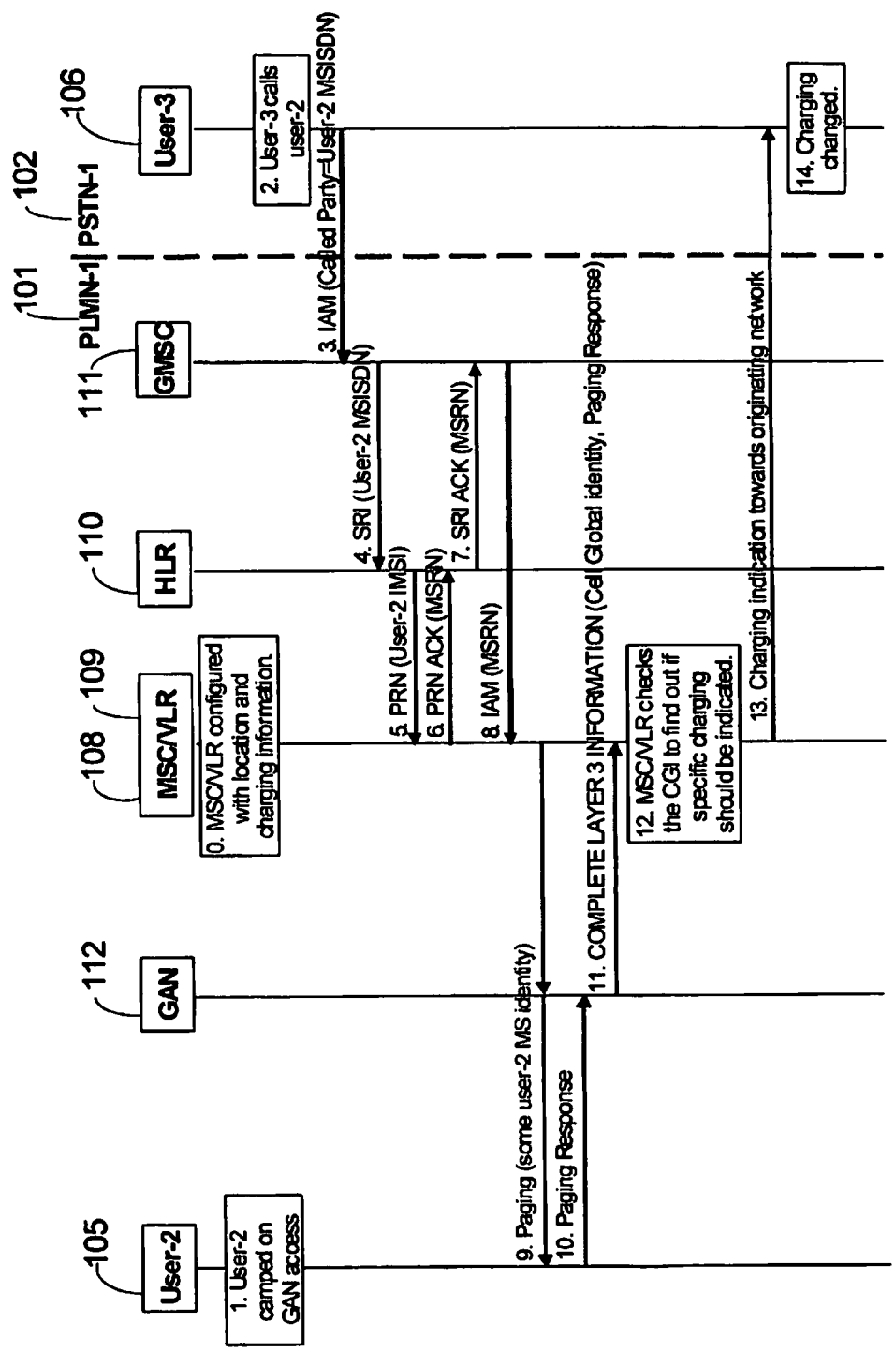
FIG. 2 illustrates embodiments of the method and apparatus for providing differentiated tariffs or charging depending on the access network of a called mobile communication apparatus.

Both the steps 13a and 13b corresponds to the step 13 in FIG. 2. Obviously the step 13b happens later in the signaling flow as it takes place first after the call establishment but it corresponds to the step 13 as the charging indication is provided first at this stage.

If the Connected Number is used then the Address presentation restricted indicator could be set to "Presentation not allowed" or the originating network supporting this new functionality could remove parameters including the number used for the charging indication to avoid displaying on the end user terminal if this is desired.

The method is not limited to the embodiment described herein, but different combinations of the mechanisms shown in FIG. 3 can be applied simultaneously.

Additionally, an indication about the access network used on the B-side, i.e. GAN in this embodiment, may be provided to the calling subscriber from the network on the B-side, i.e. PLMN-1 101 in this example. This indication could be e.g. a voice message that is played to the calling subscriber. A similar indication could also be provided on the A-side, i.e. PSTN-1 102 in this example.

The reason for the access network indication, i.e. instead of a charging indication from the network on the B-side, i.e. PLMN-1 101 in this embodiment, is that the network on the A-side, i.e. PSTN-1 102 in this embodiment, decides the charging to be applied and the B-side network will not normally know the exact tariff.

The originating network receives the indication about the new charging, and in response, the originating network, i.e. PSTN-1 102, changes the charging dependent on the current terminating network in step 14.

Depending on which type of charging is applied (i.e. non-Real-time or Real-Time charging), the originating network takes actions. For non-Real-time charging it may be sufficient to include the received charging information (i.e. Tariff Indicator, Generic Number or Connected Number) in the charging output records. For Real-time charging it may be sufficient to forward the received charging information (i.e. Tariff Indicator, Generic Number or Connected Number) towards the node handling Real-time charging.

The many features and advantages of the invention are apparent from the detailed specification, and thus, it is intended by the appended claims to cover all such features and advantages of the invention, which fall within the scope of the invention. However, although embodiments of the method and apparatus of the invention has been illustrated in the accompanying drawings and described in the foregoing detailed description, the disclosure is illustrative only and changes, modifications and substitutions may be made without departing from the scope of the invention as set forth and defined by the following claims.

In some embodiments the PLMN-1 uses some internal tariff indications inside the PLMN-1 and then the GMSC changes the information depending on which network originated the call. In this case the GMSC contains the needed mapping tables from the internal tariffs towards operator-specific and agreed values.

For example in alternative 1 described with reference to FIG. 3, this means that the MSC 108 sends the CRG-message containing a value X towards the GMSC 111. The GMSC 111 performs the needed mappings towards different operators. For PSTN-1 102 the value X is mapped to a value Z and if the call was originated from PLMN-2 103, the value X may be mapped to e.g. a value Y.

Similar actions may be taken for the alternative 2 described with reference to FIG. 3, i.e. that the whole or parts of the Generic or Connected Number is mapped depending on the operator "on the other side".

The embodiments have been described above in conjunction with a call scenario, wherein the user-3 of terminal 106 in PSTN-1 calls the user-2 of terminal 105 in PLMN-1 101. This is only one example of a call scenario illustrating advantage embodiments and it is not intended to limit the scope of the invention. The following call scenarios are further examples illustrating the advantages of the method an apparatus of the invention, wherein differentiated tariffs or charging is used depending on the access network of a called mobile communication apparatus. User-3 in PSTN-1 calls user-2 in Femto GSM part of PLMN-1. User-4 in e.g. macro GSM part of PLMN-2 calls user-2 in GAN or Femto GSM part of PLMN-1.

However, in case user-3 in PSTN-1 calls user-1 in macro GSM part of PLMN-1 or user-4 in e.g. macro GSM part of PLMN-2, the call may be charged as today using existing mechanisms in PSTN-1. In case users in e.g. macro GSM part of PLMN-2 calls user-1 in macro GSM part of PLMN-1, the call may be charged as today using existing mechanisms in PLMN-2.

Other differentiated services than differentiated charging is also possible within the scope of the invention.

Although the embodiments of the MSC/VLR described with reference to the drawings comprise a computer apparatus and processes performed in the computer apparatus, the invention also extends to programs on or in a carrier, adapted for putting the invention into practice when the computer program is executed. The program may be in the form of source code, object code a code suitable for use in the implementation of the method according to the invention. The carrier can be any entity or device capable of carrying the program. For example the carrier may be a record medium, computer memory, read-only memory or an electrical carrier signal.

The invention claimed is:

1. A method of providing differentiated services in a communications network, comprising:
   in response to a calling communication apparatus initiating a call towards a called communication apparatus, receiving in a mobile services switching centre an indication message from a first radio access network, said message indicating a radio access network type to which the called communication apparatus of a terminating communication session is connected,
   in response to the indication message:
   accessing differentiated service information associated with the radio access network type of the terminating communication session, the differentiated service information comprising location information or charging type, indicated by the radio access network of the terminating communication session,
   sending the differentiated service information to be applied for service differentiation by a second access network of the calling communication apparatus, wherein the first radio access network has a different access network type than the second access network; and
   wherein sending the differentiated service information includes sending charging information to the calling communication apparatus, wherein the charging information depends on the access network type of the first radio access network;
   wherein sending differentiated service information comprises sending a Connect Integrated Services Digital Network (ISDN) User Part (ISUP) message with the differentiated service information indicated in a Generic or Connected Number field after establishing a terminating call between the mobile services switching centre and the called communication apparatus.

2. The method according to claim 1, wherein sending differentiated service information comprises sending a Charge Information Integrated Services Digital Network (ISDN) User Part (ISUP) message with the differentiated service information indicated in a Tariff Indicator field.

3. The method according to claim 1, wherein sending differentiated service information comprises sending an Answer Integrated Services Digital Network (ISDN) User Part (ISUP) message with the differentiated service information indicated in a Generic or Connected Number field.

4. The method according to claim 1, wherein an Address presentation restricted indicator is set to "Presentation not allowed".

5. The wherein sending differentiated service information comprises sending one or more of Charge Information ISUP message and Answer Integrated Services Digital Network (ISDN) User Part (ISUP) message with the tariff information indicated in a Generic or Connected Number field.

6. The method according to claim 1, wherein accessing the differentiated service information comprises accessing an internal service information of the mobile services switching centre and amending the differentiated service information based on the first radio access network type.

7. The method according to claim 1, wherein the radio access network to which the called mobile communication apparatus is connected and the radio access network to which the calling mobile communication apparatus is connected is different radio access networks.

8. The method according to claim 1, wherein the differentiated service information is Location Area Identities (LAI), or Cell Global Identifiers (CGI), for Global System for Mobile Communications (GSM) networks or LAI, or Service Area Identities (SAI), for Universal Mobile Telecommunications System (UMTS) networks, or Charging Type.

9. The method according to claim 1, wherein the radio access network to which the called mobile communication apparatus is connected is any of a Global System for Mobile Communications (GSM), Generic Access Network, Femto GSM, or Wideband Code Division Multiple Access (WCDMA) network.

10. The method according to claim 1, wherein the radio access network to which the calling mobile communication apparatus is connected is any of a public switched telephone network, Global System for Mobile Communications (GSM), Generic Access Network, Femto GSM, or Wideband Code Division Multiple Access (WCDMA) network.

11. The method according to claim 1, wherein the differentiated service information is charging information for differentiated charging of terminating communication sessions.

12. A mobile services switching centre for differentiated charging of terminating communication sessions with computer capabilities comprising:
   a computer processor for executing computer programs and processing data, and
   storage means connected to the computer processor for storing data and computer program, wherein the mobile services switching centre is configured to:
   store differentiated service information associated with different radio access types,
   in response to a calling communication apparatus initiating a call towards a called communication apparatus, receive an indication message from a first radio access network, said message indicating a radio access network type to which the called communication apparatus of a terminating communication session is connected,
   in response to the indication message:
   access differentiated service information associated with the radio access network type of the terminating communication session, the differentiated service information comprising location information or charging type, indicated by the radio access network of the terminating communication session,
   send the differentiated service information to be applied by a second access network of the calling communication apparatus, wherein the first radio access network has a different access network type than the second access network; and wherein sending the differentiated service information includes sending charging information to the calling communication apparatus, wherein the charging information depends on the access network type of the first radio access network;

wherein sending differentiated service information comprises sending a Connect Integrated Services Digital Network (ISDN) User Part (ISUP) message with the differentiated service information indicated in a Generic or Connected Number field after establishing a terminating call between the mobile services switching centre and the called communication apparatus.

13. The mobile services switching centre according to claim 12, wherein the computer processor is configured to access the differentiated service information in a table to decide if a differentiated service should be indicated with respect to the current network of the called terminal towards the network from where the call was initiated.

14. The mobile services switching centre according to claim 12, wherein the differentiated service information is a charging information.

15. The mobile services switching centre according to claim 14, wherein the charging information is a numeric value indicating a specific tariff, or a prefix, or whole telephone number that is to be used to create a generic or connected number.

16. The mobile services switching centre according to claim 12, wherein the differentiated service information is Location Area Identities (LAI) or Cell Global Identifiers (CGI) for Global System for Mobile Communication (GSM) networks or LAI, or Service Area Identities (SAI) for Universal Mobile Telecommunications System (UMTS) networks, or Charging Type.

* * * * *